Figure 6:
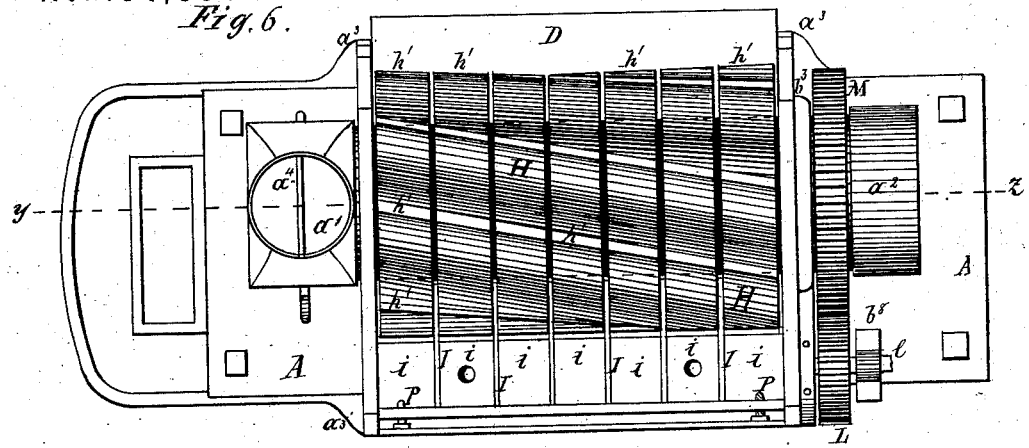

4 Sheets--Sheet 1.
P. L. McDOWELL.
Machine for Cutting Fats for Rendering.
No. 164,854. Patented June 22, 1875.
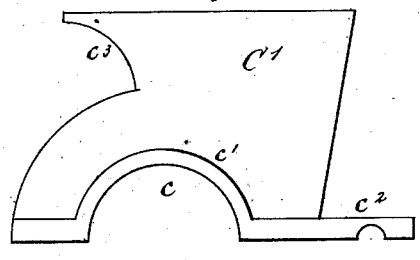
Fig. 10.
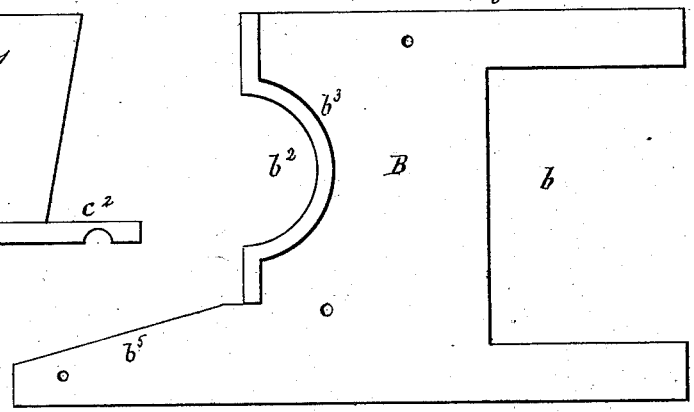
Fig. 12.
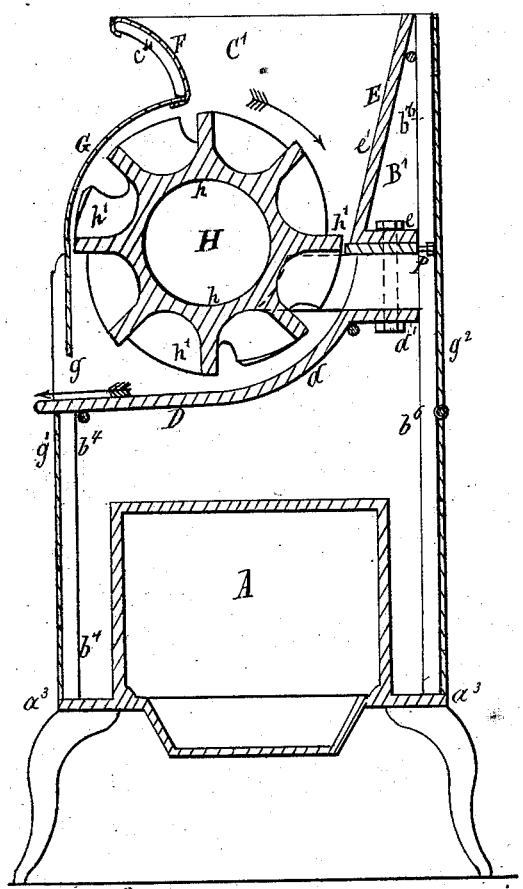
Fig. 1.
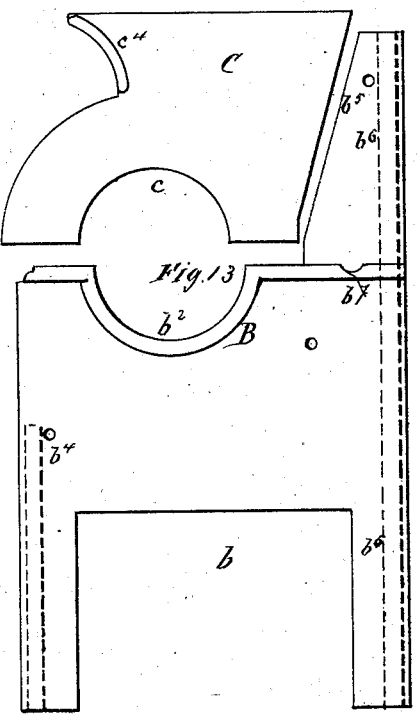
Fig. 11.
Fig. 13.
Witnesses
W. A. Dangerfield,
Henri Guillaume
Inventor
Philip L. McDowell
per Henry Orth 4 Sheets--Sheet 2.

P. L. McDOWELL.
Machine for Cutting Fats for Rendering.

No. 164,854. Patented June 22, 1875.

Witnesses
W. A. Daugerfield
Henri Guillaume

Inventor
Philip L. McDowell
fr. Henry Orth
atty

THE GRAPHIC CO. PHOTO-LITH. 39 & 41 PARK PLACE, N.Y.

4 Sheets--Sheet 3.
P. L. McDOWELL.
Machine for Cutting Fats for Rendering.
No. 164,854. Patented June 22, 1875.
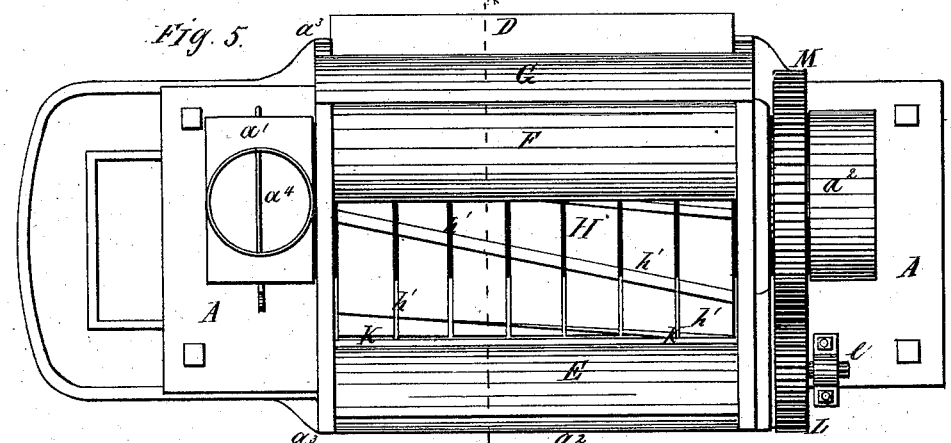
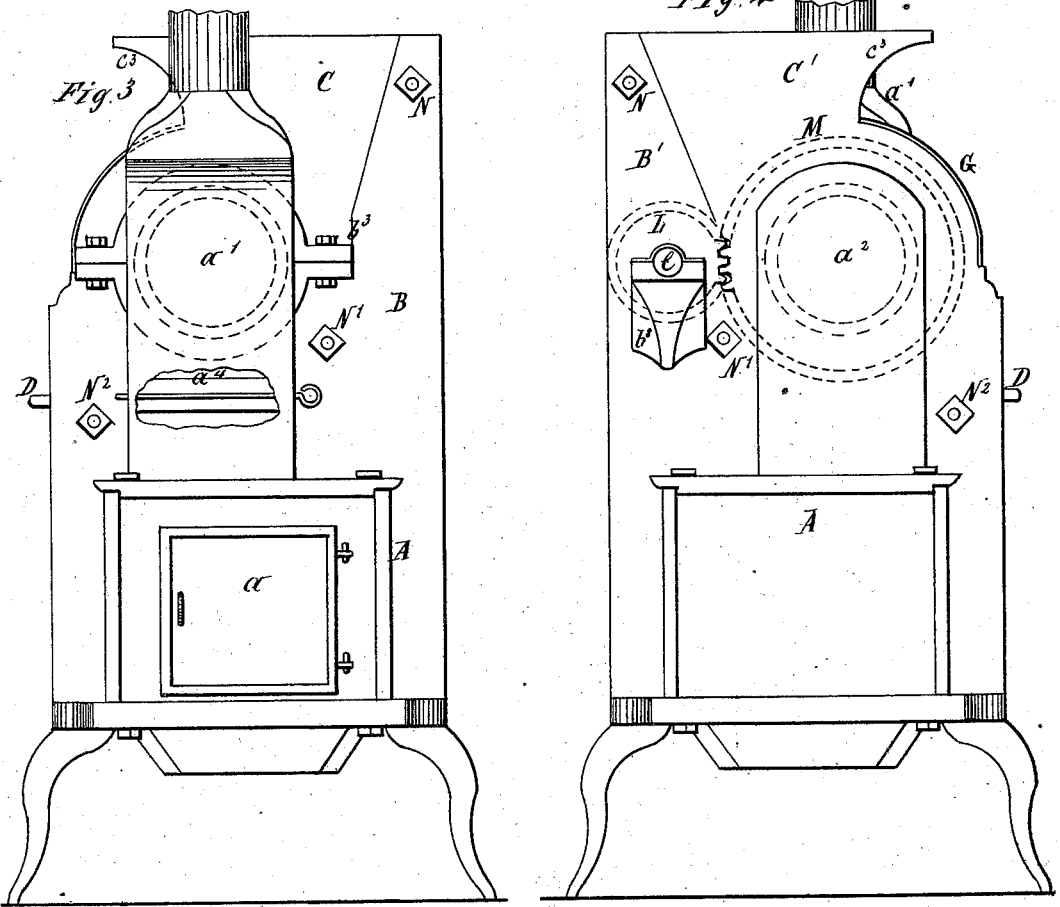
Witnesses
W. A. Dangerfield
Henri Guillaume
Inventor
Philip L. McDowell
by Henry Orth
atty P. L. McDOWELL.
Machine for Cutting Fats for Rendering.

No. 164,854. Patented June 22, 1875.

Witnesses
W. A. Dangerfield
Henri Guillaume

Inventor:
Philip L. McDowell
p Henry Orth
atty.

UNITED STATES PATENT OFFICE.

PHILIP LEE McDOWELL, OF KENTON, OHIO.

IMPROVEMENT IN MACHINES FOR CUTTING FATS FOR RENDERING.

Specification forming part of Letters Patent No. 164,854, dated June 22, 1875; application filed March 31, 1875.

*To all whom it may concern:*

Be it known that I, PHILIP LEE McDOWELL, of Kenton, in the county of Hardin and State of Ohio, have invented certain new and useful Improvements in machines for cutting up fat meats preparatory to rendering them into lard, of which the following is a specification:

My invention relates to machines especially adapted for cutting up of fat meats, such as the fat of pork, preparatory to rendering it into lard, and consists, first, in the application of heat to the apparatus to prevent the fat from sticking to and becoming wedged in the cutting machinery, clogging, or choking the same, and in means for regulating and diverting the heat; secondly, in a novel arrangement in the working or cutting parts of the machine whereby such parts are kept at a proper temperature to obviate the clogging of the apparatus; thirdly, in a novel construction of the cutting-cylinder and the cutting-knives, and in means for adjusting the latter or removing them for sharpening or repairs; fourthly, in the employment of an adjustable cutter-bar or plate acting in conjunction with the cutter-cylinder independent of the knives, and by means of which said knives are held in their proper positions; and, lastly, in certain details of construction and arrangement of the apparatus.

Machines of this class as heretofore constructed could never be employed in packing-houses for cutting up the fat of hogs on a large scale preparatory to rendering such fat into lard, however efficient and well constructed such machines may be, because there were no provisions made to prevent the cutting devices from becoming clogged or choked by the fat sticking to and wedging itself between the knives or cutting-cylinder, necessitating the constant attention to the mechanism for the purpose of relieving the cutting devices, an operation not only tedious but one which occasions great loss of time, and making the process a very slow one to such an extent that machines of this character are but little used in large establishments, and are substituted by the ordinary knife or cleaver which is at all events a very slow process besides entailing a loss of material, arising from the fact that, for want of time, the fat cannot be cut up as fine as desired to obtain the best results.

My invention has for its object to remedy these defects in producing a machine which is simple in construction, hence not very costly, and so arranged that all its working or cutting parts shall at all times be heated to any required temperature to prevent the fatty substances from sticking to or becoming wedged in the cutting mechanism, with proper means to regulate the heat, and the whole arranged so that it may be taken apart with great facility and in such a manner that ready access may be had at all times to the cutting mechanism for removal and sharpening purposes, or for repairs.

By the peculiar construction of the parts machines of any desired sizes may be built, and thus rendering them generally available to all the branches of the trade in which such are required, or for household purposes.

But, that my invention may be fully understood, I will proceed to describe the same in detail by aid of the accompanying drawings.

Figure 2:
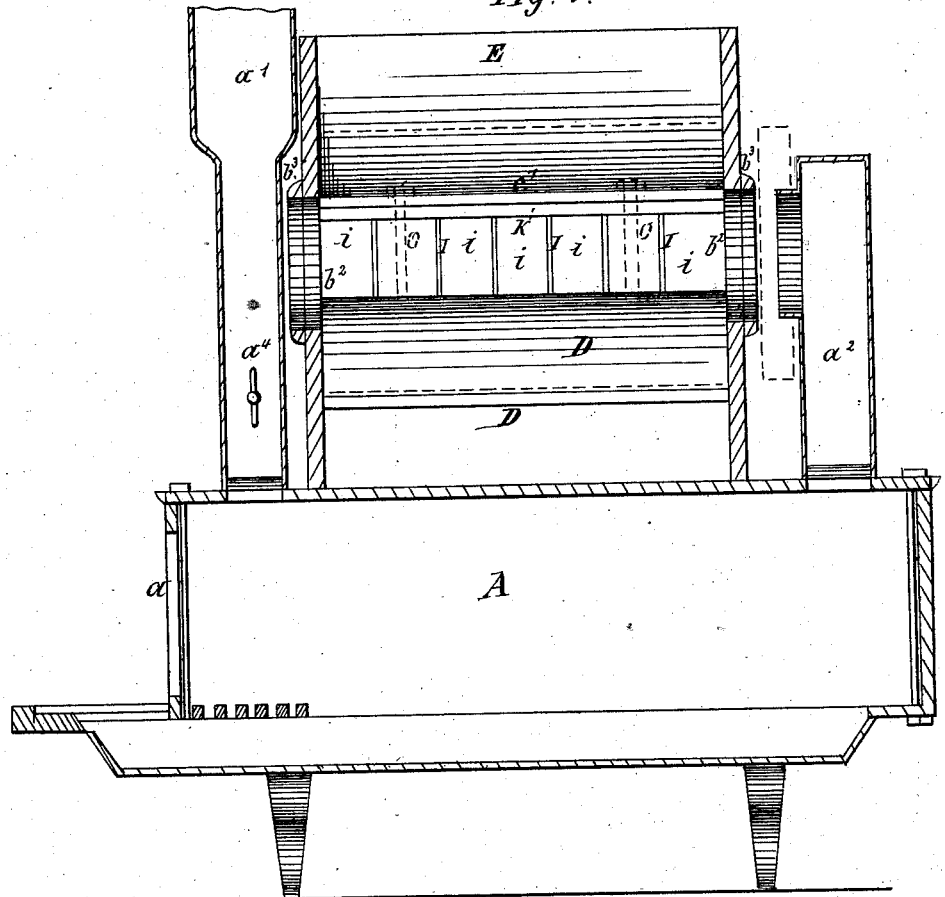
Figure 9:
Figure 8:
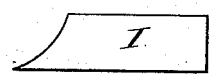
Figure 7:
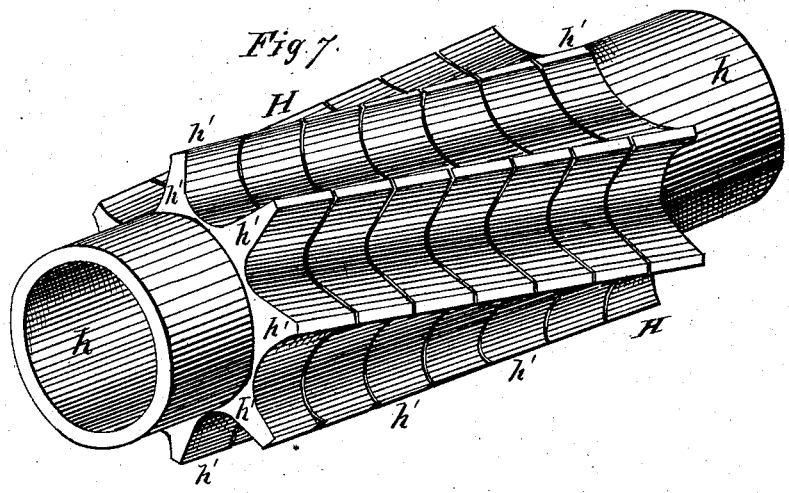

Figure 1 is a vertical transverse section through line $v\,x$ of Fig. 5. Fig. 2 is a vertical longitudinal section through line $y\,z$ of Fig. 6, showing the interior of the cutting-box with the cylinder removed. Figs. 3 and 4 are opposite end elevations. Fig. 5 is a top-plan view. Fig. 6 is a similar view with part of the side plates removed to show the arrangement of the rotary cutter or cutting-cylinder and the knives. Fig. 7 is a perspective view of the rotary cutters. Figs. 8 and 9 are side elevations of one of the knives and blocks. Figs. 10 and 11 are similar views of the upper end plates of the cutting-box; and Figs. 12 and 13 are elevations of the lower end plates of the cutting-box.

In the accompanying drawings similar letters of reference are employed to indicate corresponding parts wherever they may occur.

A is the furnace, of cast-iron, and of any desirable or convenient form, having its top either square or rounded. This furnace projects some distance on either end of the machine, and has a suitable door, $a$, and a grate.

The top plate of the furnace in front and rear ends of the machine is provided with suitable apertures, having a projecting rim or flange formed around them for the adjustment and holding of the flues $a^1$ $a^2$. The top plate inside the furnace, immediately under the bed-plate of the cutting-box, may be dispensed with, if desired. I prefer, however, to use a top plate, so that the heat and flame may not directly impinge upon the bed-plate of the cutting-box, though, in large stationary machines, and especially in those heated by steam, this bed-plate may be made heavy enough to dispense with that portion of the top plate of the furnace immediately under it, and in such machines the furnace may be of brick-work. B B' are the lower front and rear vertical end plates of the cutting-box, and C C' are the upper front and rear end plates of the same, all of cast-iron, and fully illustrated by Figs. 10, 11, 12, and 13. The plates B B' have each an opening, $b$ $b$, formed therein, of a shape to fit over and onto the furnace A, the lower portions of the vertical end plates resting upon a flange or projection, $a^3$, formed on each side of the bottom plate of the furnace A, and when the latter is of brick these end plates also rest upon brick foundations. These plates B B' have also each a semicircular recess or opening formed in their upper part, which recess $b^2$, in conjunction with similar recesses $c$ $c$ formed in the upper end plates C C', form bearings for the cutting-cylinder. The front end plates B C, or those over the firing end of the furnace, have also each a semicircular rim or flange, $b^3$ $c^1$, formed around the semicircular recesses $b^2$ $c$ on the outside of the plates, which, when they are in position, form a circular collar or flange, which enters an aperture formed for the purpose in the flue $a^1$, and also serves to hold the latter in position. The plates B B' are further provided with a vertical rib or projection, $b^4$, on their inner sides, upon which the front end of the bed-plate rests, and against which a sheet-iron plate is fastened below the bed-plate of the cutting-box. The upper vertical portions of the end plates B B' extend upward at an angle, as shown at $b^5$, and are on that side also provided with inner projecting ribs $b^6$, against which the back plate of the cutting-box rests, and to which the hinged sheet-iron door is affixed. On the outside of the plate B' a projecting ledge, $b^7$, is formed or otherwise affixed, having a semicircular recess formed therein, which, in conjunction with a horizontal projecting arm, $c^2$, having a similar semicircular recess when the plates are in position, serves as a bearing for one end of the shaft $l$ of the pinion L, the other end of said shaft having its bearings in a bracket, $b^8$, formed on or affixed to the plate B', and by means of this ledge $b^7$ and arm $c^2$ the two plates are bolted together. The plates C C' are curved inward, and are then again curved outward in shape to cover or surround the cutting-cylinder. The inwardly-curved portion $c^3$ has similar flanges formed on their inner sides, as shown at $c^4$, supporting a simi-larly-shaped sheet-iron plate, F, Figs. 1 and 5, which, with the inclined portion $e'$ of the back plate E of the cutting-box, form the hopper of the apparatus. D is the bed-plate, having a segmental and slightly-inclined part, $d$, and a horizontal portion, $d^1$, and vertical part $d^2$. The horizontal part $d^1$ forms a shelf or ledge upon which the knives and cutting-bar or plate rest, as more fully described hereinafter, while the vertical portion forms part of the back of the cutting-box, against which the knives and blocks abut. This plate D, as well as the back plate E, are fully illustrated by Figs. 1, 2, and 5. The back plate E is of triangular shape, having a horizontal portion, $e$, or base, which rests upon the knives and cutting bar or plate, and an inclined portion, $e^1$, which constitutes the balance of the back of the cutting-box. The upper edge of the inclined portion $e'$ rests against the rib $b^6$, and, as already stated, forming, with the inwardly-curved sheet-iron plate F, the hopper of the machine, as plainly illustrated by Fig. 1. G is another sheet-iron plate curved outward to surround the cutting-cylinder, and is bolted or otherwise fastened to the outwardly-curved portion of the upper plates C C', having an opening, $g$, at or near the under surface of the cutting-cylinder, as shown by Fig. 1, through which the cut fat is forced into a suitable receiver.

The bed-plate D may be caused to project some distance outward, or it may have an inclined delivery-apron hinged or otherwise attached thereto, for the delivery of the cut fat into suitable receptacles for removal, or a hopper-shaped delivery-board may be used. Underneath the bed-plate D, and between the lower end plates B B', a sheet-iron plate, $g^1$, is bolted or otherwise affixed to the vertical ribs or flanges $b^4$ on the inner sides of said plates B B', and on the opposite side a similar plate, $g^2$, formed in two parts, the upper one being hinged to the lower one a little below the vertical portion $d^2$ of the back-plate D is bolted or otherwise affixed to the vertical ribs or flanges $b^7$ of the plates B B'. The upper portion of the hinged part is provided with suitable means to fasten it to the top of said ribs $b^7$ in such a manner that it may be swung down, when desired, to have access to the knives and cutter-bar or plate, or when it is desired to regulate or divert the heat from the heating-chamber.

By this arrangement and construction of the frame of the cutting-box a space is left on all sides around the top plate and sides of the furnace for the heat to radiate therefrom, and surround the whole of the under and lateral sides of the cutting devices, thus forming a heating-chamber, whereby the cutting mechanism is kept at the proper temperature to prevent the fat from sticking to or becoming wedged in said mechanism, and clog or choke up the same.

The whole of the frame is held together and effectively secured in position by the through bolts or bars N N¹ N², though, if desired, the lower and upper end plates may be provided at their junction with lips or projections having apertures formed therein for the insertion of bolts secured by nuts.

Having now described the construction and general arrangement of the frame and furnace I will proceed to describe in detail the cutting mechanism.

H is the cutting-cylinder made of steel, having an enlarged axis, $h$, of considerable inside diameter, which is hollow, and forms a flue or passage for the heat and products of combustion from the furnace A. This cylinder has its bearings in the end plates B B¹ C C¹, as already explained and fully illustrated by the drawings, and is connected at the firing end of the furnace with the flue $a^1$, while on the other end the hollow axis $h$ is extended some distance outside of the end plates, and carries a cog-wheel, M, on the other side of which it is also connected with the flue $a^2$ by means of a rim or collar formed around a suitable aperture in said flue, which collar enters into the hollow axis of the cylinder H.

This axis is provided with a series of cutters, $h^1$, arranged in a spiral manner around the axis $h$, as shown by Figs. 1, 6, and 7, separated from each other sufficiently to allow the knives I to pass between them when the cylinder is rotated by the pinion L meshing into the cog-wheel M, power being applied to the shaft of said pinion L.

The face or cutting portion of the cutters $h'$ is square, as shown, so that when the cylinder H is revolved these cutters act first on the fat, in conjunction with a cutter-bar or plate, K, hereafter more fully described. The cutters, being arranged spirally, pass by the plate K at an angle forming a shear-cutting device, by means of which the fat is first cut into large strips or pieces before reaching the series of knives I. These cutters $h'$ may be made separately from the hollow axis, and may be provided with a collar to slip them onto and over the hollow axis $h$, each being separated from the other by intervening collars or diaphragms of sufficient thickness to allow of the passage of the knives I, and when so arranged may be held in position by longitudinal and vertical through-bolts, to prevent them from rotating with the cylinder, or the cutters may be made in sections and affixed to the hollow axis in any suitable manner.

The proper arrangement of these cutters will readily suggest itself to the skilled mechanic, as they may be arranged in various ways with a view to economy and convenience.

I are the knives, having the cutting formed concave, or nearly so, to conform to the convex surface of the axis of the cylinder. These knives I are held in position by means of blocks $i$ upon the ledge or shelf formed by the horizontal part $d'$ of the bed-plate D, each knife being separated from the other by an intervening block, $i$, of a width equal to the width of the cutters $h'$ on the cylinder H, so that, when in position, they will lie opposite the slots formed between each two of the cutters $h'$. The blocks $i$ have their front faces also formed segmental or concave to allow the cutters $h'$ to clear them, and to form with the bed-plate a continued curve to conform with the curve described by the cutters $h'$ in their revolution with the hollow axis $h$.

The knives I and blocks $i$ rest loosely upon the horizontal plate $d^1$, and bear against the vertical part $d^2$ of the bed-plate D, and are secured in position by means of the cutter-bar or plate K, which rests on top of the knives I and blocks $i$, (and projects slightly over the upper surface of the blocks $i$,) and the horizontal part $e$ of the back plate E and the set-screws O, which pass through the horizontal part or shelf $d^1$ of the bed-plate D, thence through one of the blocks $i$, at or near either end of the series of knives I, and through longitudinal slots $k$ formed in the cutter-bar or plate K, into the horizontal portion $e$ of the back-plate E. Two or more set-screws O may be used for the purpose. By this arrangement the bed-plate D and the blocks $i$ form an unbroken wall, having no recesses wherein the fat could lodge, and the bed and back plates, as well as the intervening cutting-bar K, the knives I, and blocks $i$, are readily secured in position. The longitudinal slots $k$ in the cutting-bar or plate K are formed for allowing such plate K to be adjusted to the cutting-edges of the cutters $h'$, and for this purpose two or more set-screws, P, may be employed, which pass through the vertical portion $d^2$ of the bed-plate D, to the back of the cutting-bar or plate K, whereby said bar or plate is adjusted horizontally. The vertical portion $d^2$ of the bed-plate D is sufficiently high to be flush with the upper surface of the cutting-bar K.

By means of the hinged plate or door $g^2$ ready access may be had at all times to the set-screws P and O, and by loosening the latter and the through bolt or bar N the plates E K and the knives I and blocks $i$ may be readily removed, either for sharpening the knives I or for repairs of the same. By this arrangement the knives I are also made adjustable with relation to the cylinder H, as they may be readily advanced toward said cylinder when so required by the wear of their cutting edges.

The operation of the machine is as follows: The damper with which the flue $a^1$ is provided being closed, as shown by Fig. 3—where part of the flue is broken away to show the same—a fire is started in the furnace. Portions of the heat and the products of combustion pass under the cutting-box to the other end of the furnace A, thence up through the flue $a^2$ into the hollow axis of the cylinder H, and out of said axis to the atmosphere, or a chimney through the flue $a^1$. The heat which is radiated by the top plate of the furnace passes into the heating-chamber which surrounds one side and the bed of the frame containing the cutting mechanism, while the cylinder H is heated directly from the furnace by the passage through its axis of a portion of the heat and the products of combustion. When the cutting mechanism has acquired a sufficient degree of heat, power is applied to the shaft $l$ of the pinion L, either by hand in small machines, or by a belt-pulley driven by a steam-engine, the motion being communicated by the pinion L to the cog-wheel M and cylinder H. The fat is then introduced into the machine by being placed or thrown into the upper part or hopper formed by the inwardly-curved plate F and the inclined part $e^1$ of the back plate E. The cylinder in its revolution will cut the fat into large pieces, by bringing it in contact with the cutters $h^1$ and the horizontal cutting-plate K. The cutters $h^1$ being arranged spirally around the axis will pass the plate K at an angle more or less open, according to the convolution of the cutters $h^1$, thus forming a shear cut, which first slices the fat into large pieces, forcing it then upon the knives, where it is again cut to the required size, and ejected through the opening $g$.

Should the apparatus become too much heated the damper $a^4$ in the flue $a^1$ is opened and a similar damper, with which the flue $a^2$ may be provided, is closed. The heat and products of combustion will then escape directly through the flue $a^1$ without passing through the hollow cylinder, and the hinged plate $g^2$ may also be lowered, thus opening the heating-chamber, allowing the heat therein to escape.

I have here described, and shown in the drawings, an apparatus heated by means of a furnace, though it will be evident to any practical mechanic that, by slightly modifying the construction of the frame of the apparatus, a steam-jacket may readily be substituted for the furnace and steam-pipes for the flues, the pipes being provided with suitable stop-cocks. Thus the apparatus may be readily heated by steam supplied from the boiler of the driving-engine, whereby the necessity of starting and keeping up a fire, as well as the furnace and flues, may be dispensed with, effecting a considerable saving when machines of this character are used in establishments where a steam-engine is already employed, as is the case in large packing-houses, while on the other hand, for small machines suitable for household purposes, a spirit or other lamp will be sufficient to heat the cutting devices as required.

Having described my invention, what I claim, and desire to secure by Letters Patent, is—

1. In a machine for cutting fats for rendering purposes, the rotary cutting-cylinder H, having a hollow axis and provided with a series of cutters or knives arranged spirally around said axis in such a manner as to form a slot between each two cutters or knives, substantially as described, and for the purposes specified.

2. The combination, with the knives I and blocks $i$, of the cutter-bar or plate K, bed-plate D, and back-plate E, arranged in relation to each other substantially as described, and for the purposes specified.

3. The combination of the cutter H with the adjustable cutter-bar or plate K, substantially as set forth.

4. The combination of the cutter-bar or plate K with the bed-plate D, and the set-screws P P, as and for the purposes specified.

5. The combination of the knives I and the cutter-plate K with the cutter H, when constructed and arranged to operate substantially as specified.

6. The combination of the frame of a machine for cutting fats for rendering purposes with the heating apparatus to form a heating-chamber beneath the cutting devices, as and for the purposes specified.

In witness that I claim the foregoing I have hereunto set my hand this 26th day of March, 1875.

PHILIP LEE McDOWELL.

Witnesses:
ANSON NORTON,
W. A. NORTON.